Dec. 15, 1970      P. D. GEORGE      3,546,984
LATHE

Filed Oct. 2, 1967      2 Sheets-Sheet 1

INVENTOR.
PETER D. GEORGE
BY
ATTORNEYS

Dec. 15, 1970  P. D. GEORGE  3,546,984
LATHE

Filed Oct. 2, 1967  2 Sheets-Sheet 2

INVENTOR.
PETER D. GEORGE
BY

ATTORNEYS

# United States Patent Office 3,546,984
Patented Dec. 15, 1970

3,546,984
LATHE
Peter D. George, 156 Crabtree Road,
Quincy, Mass. 02171
Filed Oct. 2, 1967, Ser. No. 672,153
Int. Cl. B23b 3/06
U.S. Cl. 82—2                    3 Claims

ABSTRACT OF THE DISCLOSURE

A lathe is provided with a tailstock assembly mounted for angular movement in to and out of alignment with the chuck as well as for axial movement to or away from the chuck. Precision bubble levels are provided on both the housing and the tailstock to insure accurate alignment between the axis of the tailstock spindle and the axis of the chuck when the components are set up for operation.

The apparatus includes a cooperating mounting arrangement for accessory items such as jig tracers whereby the workpiece may be machined exteriorly and interiorly at the same time. The driving head assembly is provided with an air-bearing arrangement which permits the head to be moved towards the tailstock as well as the tailstock being arranged to be moved towards the chuck. Also the tool supporting slide is drivingly connected to a power cylinder for controlled movement with the cylinder located within the housing and its driving rod extending parallel to the lathe ways to provide a compact, relatively short machine capable of a long cutting stroke.

BACKGROUND OF THE INVENTION

Field of the invention

This invention relates generally to lathe machinery and more particularly is directed towards improvements in tailstock for lathes and other lathe components.

Description of the prior art

In a conventional lathe the tailstock is normally a relatively massive block which is clamped in position on the lathe bed. The tailstock spindle is usually adapted to be moved along the center line of the lathe for a limited distance and the tailstock itself may also be moved lengthwise of the lathe bed. However, the tailstock assembly is not normally removed from the lathe bed so that once the tailstock and the lathe are axially aligned there is usually no problem thereafter of misalignment. However, in some instances it would be desirable to remove the tailstock from the lathe in order to permit utilization of various equipment. With conventional lathes the removal and replacement of the tailstock involves a considerable amount of time and effort with great care being required to insure that the rotating parts are properly aligned when the tailstock is replaced. Also, with conventional lathes while the tailstock may be moved towards the chuck and driving housing the housing is not normally movable towards the tailstock which limits the utility of the equipment to some extent.

SUMMARY OF THE INVENTION

The present invention features a lathe apparatus in which the tailstock is mounted for movement both lengthwise and laterally of the lathe axis and is provided with precision bubble levels to permit quick, easy and extremely precise alignment between the tailstock axis and the chuck axis. The tailstock, in the preferred mode of the invention, is suspended from an overhead arbor and may be swung about the arbor axis to carry the tailstock spindle across the lathe center line. This invention also features a novel mounting arrangement for accessory equipment such as jig tracers in such a manner that the work may be machined simultaneously on the outside as well as on the inside, cut by separate tools. As a further feature of this invention, the chuck housing assembly is equipped with an air-bearing which, when actuated, permits the chuck housing to be moved easily lengthwise along the lathe bed towards the tailstock. This invention also includes novel locking arrangements for the tailstock to insure maintenance of the position of the tailstock once it has been aligned.

DESCRIPTION OF THE PREFERRED EMBODIMENT

Figure 5:
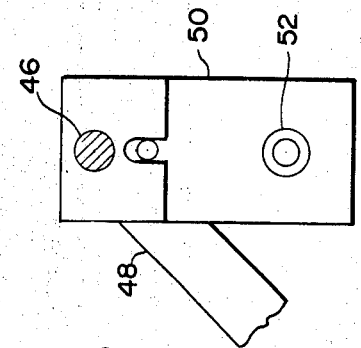
FIG. 5 is a detailed end elevation of the tailstock assembly.
Figure 1:
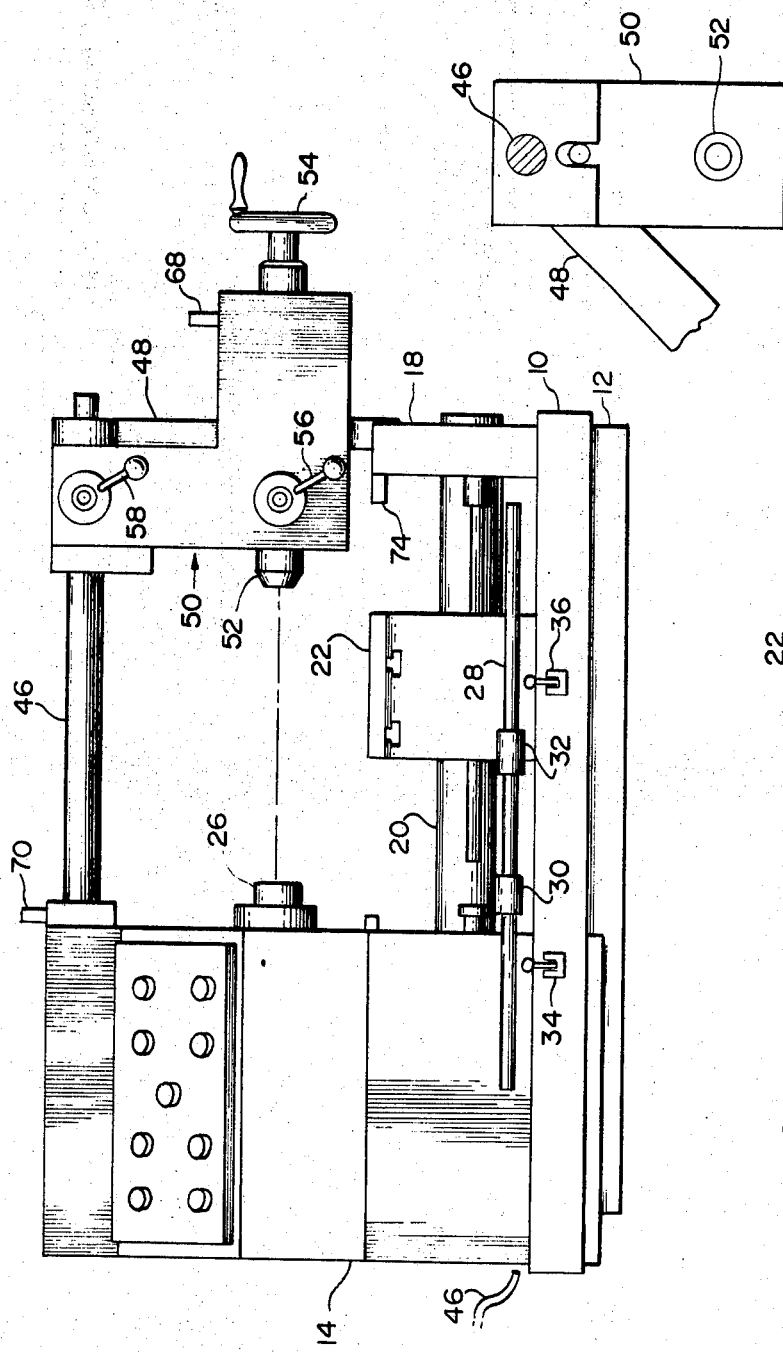
FIG. 1 is a view in front elevation of an improved lathe made according to the invention.
Figure 4:
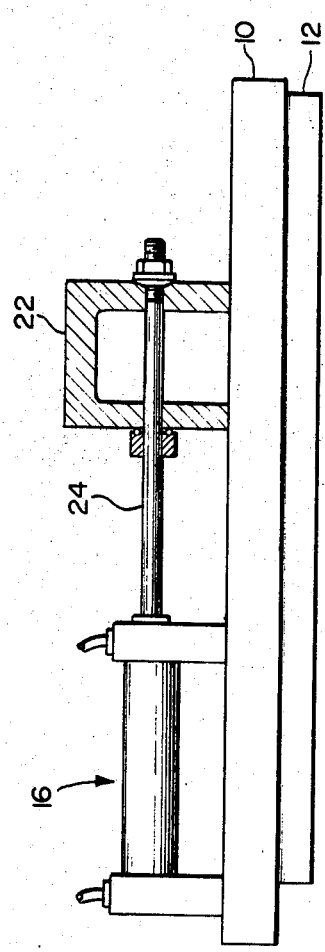
FIG. 4 is a fragmentary sectional view in front elevation of the drive system for the lathe.

Referring now to the drawings, the reference character 10 indicates a rectangular base of rigid material such as steel or granite mounted on a block 12 of a resilient material such as rubber or the like. On the left-hand side of the lathe as viewed in FIG. 1 is a housing 14 for a power cylinder 16 along with the various controls. On the right-hand side of the base is a fixed standard 18 supporting the ends of a pair of hardened metal cylindrical ways 20 the opposite ends of which are mounted in another standard within the housing 14. A carriage 22 is slidably mounted to the ways 20 and is drivingly connected by means of a rod 24 to the cylinder 16. It will be understood that operation of the cylinder 16 will serve to advance the carriage 22 along the ways to or away from the workpiece which would be held by a chuck head 26 on the housing 14.

Carried by the carriage 22 is a rod 28 having adjustable trips 30 and 32 each adapted to actuate limiting switches 34 and 36 to control the movement of the carriage and the depth or length of cuts being performed on a particular workpiece.

Figures 3, 6:
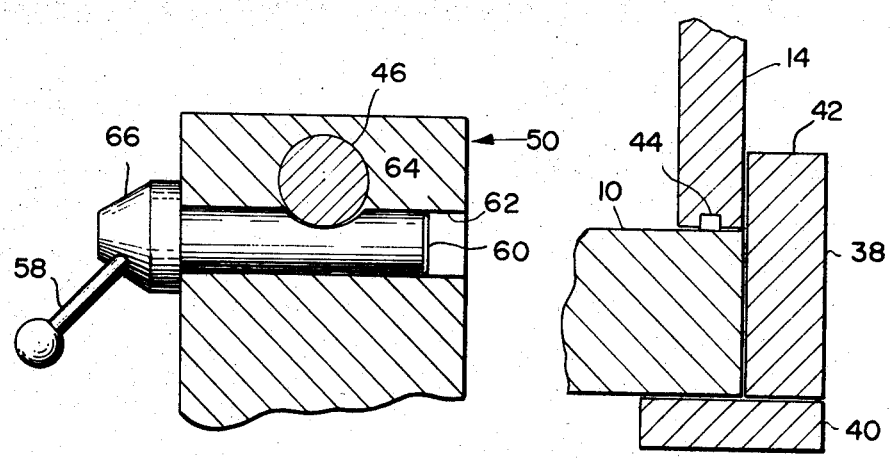
FIG. 3 is a fragmentary sectional view in side elevation showing the tailstock locking mechanism.
FIG. 6 is a detailed section showing the air-bearing arrangement.

The housing 14 is normally clamped in one position on the left-hand side of the base 10 but may be advanced to the right by means of an air-bearing system as shown best in FIG. 6. This includes a clamping member 38 the upper end of which is secured to the housing 14 and the lower end of which carries a leg 40 which extends in under the margin of the base 10. A bolt 42 joins members 38 and 40 in clamping engagement and in normal operating conditions the parts are bolted tightly together so that the housing 14 firmly grips the base 10.

It will be noted in FIG. 6 that the lower edge of the upright wall forming the housing 14 is provided with a longitudinal recess 4 which is connected via a conduit 46 to a source of compressed air. Should the operator desire to move the housing from its fixed position the bolt 42 is loosened and high pressure air is introduced to the passage 44. The air will provide a bearing surface for the relatively heavy housing, permitting it to be moved easily along the base 10 to any desired position. Once the position has been selected, the pressure is cut off and the housing again clamp in position.

Figure 2:
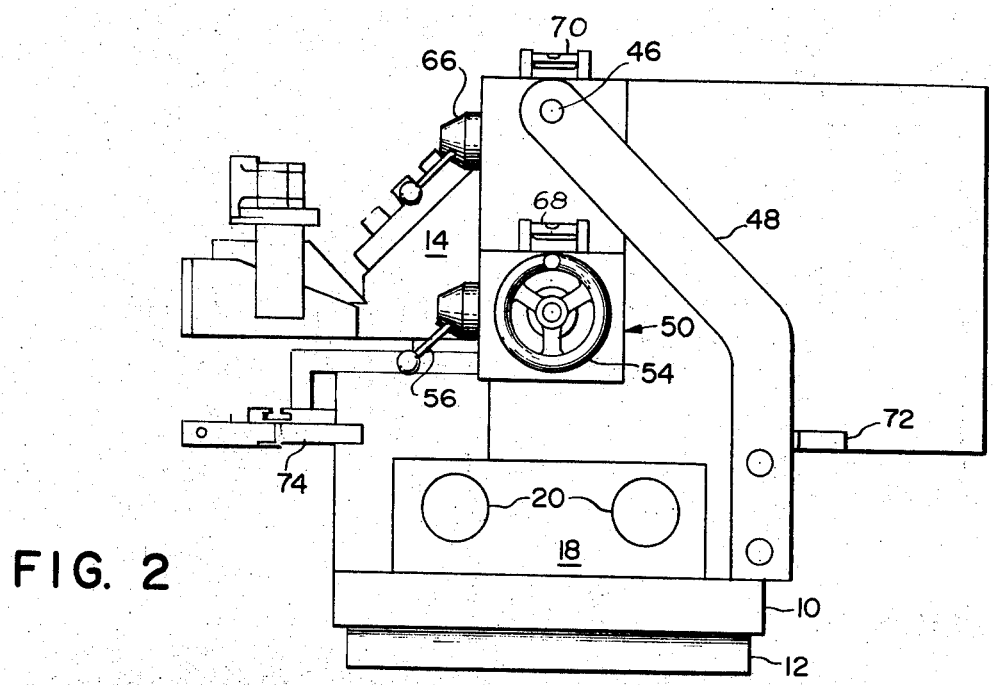
FIG. 2 is a view in end elevation thereof.

Rigidly mounted to and extending from the upper portion of the housing 14 is an arbor 46 the right-hand end of which is supported by means of offset arm 48 extending up from the base 10 as best shown in FIG. 2. Suspended from the arbor 46 is a tailstock assembly generally indicated by reference character 50. The tailstock assembly may be rotated about the axis of the arbor 46 although in normal operation the assembly will hang directly down from the arbor with the axis of the spindle of live center 52 located in precise axial alignment with the axis of the chuck head 26. In addition to being angularly movable about the arbor 46 the tailstock assembly may also be moved longitudinally of the arbor. Also the live center of spindle 52 may be advanced or retracted by operation of a crank handle 54. A locking lever 56 is provided to lock the spindle 52 in position and another lever 58 is provided for locking the tailstock assembly in position to the arbor 46.

As best shown in FIG. 3, the tailstock locking mechanism includes a drawn bar 60 extending through an opening 62 formed through the tailstock 40 and having a recessed portion 64 of a slightly greater radius of curvature than the arbor 46 seated therein. The left-hand end of the draw bar is threaded to a tapped tub 66 from which extends the arm 58. It will be understood that by manipulation of the lever arm 58 the draw bar may be tightened against the arbor to lock the assembly together or, by backing off on the hub, the bar may be released to permit movement of the tailstock assembly about and along the arbor 46.

This arrangement permits the tailstock to be moved to any position or to be removed entirely from the assembly. After the tailstock has been moved or replaced, it is necessary to insure that the axis of the spindle 52 and the axis of the chuck 26 are precisely aligned. As a novel means for carrying out the alignment a precision bubble level 68 is mounted to the tailstock assembly and a similar bubble level 70 is mounted to the housing 14 at the top thereof. The bubble levels are commercially available items and operate with extreme precision. In using the levels 68 and 70, the level 70 is used as a reference to insure that the entire lathe is perfectly upright and level and its supporting surface is horizontal. Once the position of the lathe has been established, the tailstock assembly is moved about the arbor until the bubble level 68 indicates that its supporting surface in also horizontal.

With the two bubble levels 68 and 70 matching then, geometrically, the tailstock is properly aligned with the axis of the chuck 26.

Referring again to FIG. 2 supporting shelves 72 and 74 are provided on each side of the lathe, one being part of the arm 48 and the other being part of the standard 18. The supporting shelves are provided to mount accessory equipment such as automatic jig tracers on opposite sides of the lathe. This arrangement permits one tracer to perform cutting operations on the outside of the workpiece while the jog tracer on the other side of the unit can simultaneously carry out cutting operations in the interior of the workpiece. The two units work simultaneously and will thus be able to complete machining operations in one-half the usual time required.

Having thus described the invention, what I claim and desire to obtain by Letters Patent of the United States is:

1. A lathe, comprising
  (a) a base,
  (b) a relatively fixed head mounted on said base,
  (c) a rotary chuck mounted to said head for driving rotation about a relatively fixed horizontal axis,
  (d) an arbor mounted to said head parallel to and a predetermined distance from the chuck axis,
  (e) a movable tailstock mounted to said arbor and adapted to move axially along and angularly about said arbor,
  (f) a tailstock spindle slidably mounted in said tailstock and having an axis parallel to and spaced said pre-determined distance from said arbor axis,
  (g) means for locking said tailstock in a selected position,
  (h) a first bubble level mounted on said head transversely of said fixed horizontal axis, and
  (i) a second bubble level mounted on said tailstock parallel to and jointly visible with said first bubble level,
  (j) said tailstock spindle axis being coaxial with the chuck axis when said bubble levels correspond.

2. A lathe according to claim 1 including supports on either side of said tailstock for mounting forming tools adapted to perform interior and exterior operations simultaneoulsy on a workpiece held by said chuck 3. A lathe according to claim 1 wherein said locking means includes a draw-bar extending through said tailstock chordal to said arbor, said draw bar being formed with an arcuate recess to accommodate a section of said arbor and a nut having a levered arm threaded to an end of said draw bar for shifting said bar into and out of locking engagement with said arbor

References Cited
UNITED STATES PATENTS

| | | | |
|---|---|---|---|
| 1,686,318 | 10/1928 | Gallasch | 33—181 |
| 1,749,980 | 3/1930 | Loeser | 33—181 |
| 2,761,217 | 9/1956 | King | 33—180X |

FOREIGN PATENTS

| | | | |
|---|---|---|---|
| 152,701 | 8/1953 | Australia | 144—1(–3) |
| 655,292 | 7/1951 | Great Britain | 144—1(–3) |

LEONIDAS VLACHOS, Primary Examiner

U.S. Cl. X.R.

33—207